(12) United States Patent
Siaudeau et al.

(10) Patent No.: US 9,651,970 B2
(45) Date of Patent: May 16, 2017

(54) CONTROL INSTALLATION MAKING IT POSSIBLE TO CONTROL THE ELECTRICAL POWER SUPPLY FOR A PLURALITY OF DC ELECTRICAL UNITS

(75) Inventors: Jean-Paul Siaudeau, Monnieres (FR); Anthony Pain, Moncoutant (FR); Franck Scheiber, Saint-pierre-du-chemin (FR)

(73) Assignee: SCHEIBER SA, Saint-Pierre-du-Chemin (FR)

( * ) Notice: Subject to any disclaimer, the term of this patent is extended or adjusted under 35 U.S.C. 154(b) by 843 days.

(21) Appl. No.: 14/111,388

(22) PCT Filed: May 18, 2012

(86) PCT No.: PCT/FR2012/051119
§ 371 (c)(1),
(2), (4) Date: Oct. 11, 2013

(87) PCT Pub. No.: WO2012/156651
PCT Pub. Date: Nov. 22, 2012

(65) Prior Publication Data
US 2014/0039706 A1    Feb. 6, 2014

(30) Foreign Application Priority Data
May 19, 2011   (FR) ...................... 11 54352

(51) Int. Cl.
*H02J 9/00*    (2006.01)
*G05F 1/66*    (2006.01)
(Continued)

(52) U.S. Cl.
CPC ................ *G05F 1/66* (2013.01); *H02J 13/00* (2013.01); *H02J 13/002* (2013.01);
(Continued)

(58) Field of Classification Search
CPC .......... G08B 7/066; H04L 67/125; H02J 9/00; H02J 13/0013; H02J 13/0017;
(Continued)

(56) References Cited

U.S. PATENT DOCUMENTS

| | | |
|---|---|---|
| 2008/0026781 A1 | 1/2008 | Ho et al. |
| 2010/0029268 A1* | 2/2010 | Myer ........................ F21S 2/00 455/426.1 |
| 2011/0121654 A1* | 5/2011 | Recker .................... H02J 9/065 307/66 |

FOREIGN PATENT DOCUMENTS

| | | |
|---|---|---|
| CN | 2874652 | 2/2007 |
| DE | 19620880 | 11/1997 |

(Continued)

OTHER PUBLICATIONS

International Search Report, dated Nov. 9, 2012, from corresponding PCT application.
Search Report Dated Jan. 21, 2016.

*Primary Examiner* — Arnold Kinkead
(74) *Attorney, Agent, or Firm* — Ipsilon USA, LLP (57) ABSTRACT

A control installation includes a DC power supply (4) able to power a plurality of electrical units (3), and a system (5) for managing the power supply to the electrical units (3). The installation also includes a transmitter control device (1) including radiofrequency transmission elements (10) and actuators (11) each including a transducer making it possible to control the transmission of a radiofrequency signal, and a receiver control device (2) making it possible to send to the management system (5), control signals, dependent on the radiofrequency signal or signals received, so as to activate or deactivate the power supply to at least one part of the electrical units (3). The invention also relates to a structure and a corresponding method of mounting.

13 Claims, 5 Drawing Sheets

(51) Int. Cl.
*H02J 13/00* (2006.01)
*H04L 29/08* (2006.01)
H02J 1/14 (2006.01)
H05B 37/02 (2006.01)

(52) U.S. Cl.
CPC ...... *H02J 13/0006* (2013.01); *H02J 13/0013* (2013.01); *H02J 13/0017* (2013.01); *H02J 13/0075* (2013.01); *H04L 67/125* (2013.01); H02J 1/14 (2013.01); H05B 37/0272 (2013.01)

(58) Field of Classification Search
CPC ...... H02J 13/002; H02J 13/0075; H02J 13/00; H02J 1/14; H02J 13/0006; H05B 37/0272
USPC ................ 307/64, 66, 23; 340/517; 700/286
See application file for complete search history.

(56) References Cited

FOREIGN PATENT DOCUMENTS

| DE | 202 18 249 U1 | 2/2003 |
| DE | 20218249 | 2/2003 |
| EP | 1 885 039 A2 | 2/2008 |
| JP | S51111587 | 10/1976 |
| JP | 7 015880 A | 1/1995 |
| WO | 2004034730 | 4/2004 |
| WO | 2010129369 | 11/2010 |

\* cited by examiner

CONTROL INSTALLATION MAKING IT POSSIBLE TO CONTROL THE ELECTRICAL POWER SUPPLY FOR A PLURALITY OF DC ELECTRICAL UNITS

The present invention relates generally to control installations.

The invention relates more particularly to a control installation making it possible to control the electrical power supply of a plurality of electrical units, said installation comprising:
- a DC power supply, able to power a plurality of electrical units,
- a management system for the power supply of said electrical units, said management system being interposed between said electrical units and the DC power supply.

The invention also relates to a structure, such as a vehicle or mobile house, equipped with such a control installation and a corresponding method of mounting.

Vehicles or mobile residences, also called mobile-homes, generally comprise numerous items of equipment or electrical units which are intended to be powered by a DC supply, such as a battery.

Said vehicles or mobile-homes also comprise a control installation for these electrical units which comprises a plurality of actuators each making it possible to manage the power supply of one of said electrical units by controlling the opening or the closing of the electrical link between said electrical unit and the battery. The known control installations of these vehicles or of these mobile-homes exhibit a significant number of cables which link the actuators to the electrical units to be controlled.

It is then necessary to rig up numerous cableways in the structure of the vehicle or of the mobile residence. The production of numerous cableways is irksome and may make it necessary to drill a part of the structure, thereby weakening said structure and increasing the risk of water infiltration. In particular in mobile-homes, it is necessary to strengthen the mobile-home's partitions or walls in which the actuators are intended to be installed so as to take account of the cableways rigged up in said partitions or walls and which run the risk of weakening them.

Finally, vehicles or mobile-homes are generally narrow structures inside which the work space is restricted, thereby complicating the intervention of operators in rigging up the cableways and passing said cables between the actuators and the electrical units to be controlled. Furthermore, should electrical units be rearranged and/or added, it may be necessary to modify the initial wiring.

A wireless control installation making it possible to control electrical power outputs for equipment is also known from document DE20218249. However, this installation does not make it possible to address the objective of reducing energy expenditure since the actuator of the emitter control device of this installation requires a power cell in order to operate. Furthermore, this control installation is not suitable for a DC electrical unit power supply. Indeed with such an installation, the electrical units are supplied with AC current by the mains, thereby rendering the installation unusable for the control of DC power supply electrical units in particular in the case of vehicles. It will also be noted that the mains powering (that is to say with AC current) of the electrical units requires that the installation be equipped with an electrical protection system of fuse type compatible with the characteristics of the mains current. Now, such an electrical protection system of fuse type compatible with the characteristics of the mains current is cumbersome, expensive and of limited intelligence.

The aim of the present invention is to propose an installation making it possible to solve the problems which arise with the prior art solutions set forth hereinabove.

The aim of the present invention is to propose a control installation for a structure equipped with electrical units to be controlled, and which are intended to be powered by a DC supply. In particular, the design of the installation must make it possible to reduce the energy consumption of said installation and to limit, or indeed dispense with the cableways between the actuators and the electrical units to be controlled.

For this purpose, the subject of the invention is a control installation making it possible to control the electrical power supply of a plurality of electrical units, said installation comprising:
- a DC power supply, such as a supply battery, able to power a plurality of electrical units,
- a management system for the power supply of said electrical units, said management system being interposed between said electrical units and the DC power supply, characterized in that said installation also comprises:
- an emitter control device comprising radiofrequency emission means and actuators each comprising a transducer in order to energize said radiofrequency emission means so as to control the emission of a radiofrequency signal,
- a receiver control device comprising radiofrequency reception means, able to receive the radiofrequency signals emitted by the emitter control device, and to transmit to the management system, control signals, dependent on the radiofrequency signal or signals received, so as to activate or deactivate the power supply of at least part of said electrical units.

Recall that a transducer is a device which transforms a first form of external energy that it receives into another second form of energy that it generates on the basis of the first form of energy. The function of said transducer is to transform in real time the first form of energy that it receives into this second form of energy. Said first form of energy is energy external to the transducer and which is not stored, in contradistinction to a power cell. By way of example and as detailed hereinafter, this first form of energy can be a mechanical loading applied to the transducer or energy of renewable and non-stored type, such as solar or wind energy.

The use of an emitter control device comprising an actuator formed of a transducer, for example an electromechanical transducer, allows the emitter control device to operate without any electrical power source other than that resulting from the invoking of the transducer, since, in the case of an electromechanical transducer, it is the pressure loading on the actuator which is transformed by the transducer into electrical energy so as to supply the means for emitting radio signals. Furthermore, the use of radio emission means to transmit a control signal also makes it possible to simplify the fitting of the receiver control device and of the emitter control device. Indeed, no linking wire is necessary for the communication between the emitter control device and receiver control device. The emitter control device and receiver control device can thus be positioned freely with respect to one another, while complying with the maximum transmission distance.

The application of such a solution to vehicles or mobile residences intended to be supplied with DC current, makes it possible to reduce the energy consumption of the control installation and offers maximum flexibility in the arrangement of the electrical units and corresponding actuators, since, in the case of rearrangement or modification of the electrical units, the rewiring needs are reduced or indeed nonexistent. An energy-autonomous and wireless solution such as this allows simple and fast fitting of the control installation in the structure to be equipped, without damaging said structure to be equipped.

Thus, in particular in the case of a boat, such an installation makes it possible to do away with, or to limit the number of, cableways between the actuators and the electrical units, thereby limiting the risks of infiltration and spoilage through the communication installation.

Furthermore, as detailed hereinafter, in the case of an already present wire-based control installation, the solution makes it possible to obtain dual wire-based and radio control.

According to an advantageous characteristic of the invention, said transducer is able to transform a press exerted on said actuator into an electric current so as to energize said radiofrequency emission means.

According to another advantageous characteristic of the invention, said transducer is able to transform a renewable energy source, such as solar energy, or wind energy, or a temperature difference, into an electric current so as to energize said radiofrequency emission means. In the case where said transducer is able to transform a temperature difference into an electric current, said transducer is usually called a thermocouple.

According to another advantageous characteristic of the invention, said management system comprises relays each exhibiting a pole, or pin, able to be linked to one of said electrical units and another pole, or pin, able to be linked to the DC power supply.

When said relay is a field-effect transistor, said poles, or pins, of the transistor linked the one to the electrical unit, the other to the DC power supply are the drain and the source. The control input of the field-effect transistor is formed by its pin called the gate.

According to a first embodiment of the invention, the receiver control device comprising several outputs, the control input of each relay is linked to one of the outputs of the receiver control device so as to allow the receiver control device to control said relay as a function of the radiofrequency signal or signals received.

Preferably, the installation also comprises means for recovering state information about the electrical units and for transmitting said state information to signaling means, such as a display screen.

Advantageously, said installation furthermore comprises a wire-based control device comprising a plurality of actuators so as to transmit, directly or indirectly, control signals to the power supply management system for said electrical units.

The addition of a wire-based control device makes it possible to benefit from dual wire-based and radio control for the driving of the power supply of the electrical units.

According to a second embodiment, provision may be made for the installation to comprise a microchip, termed input microchip, hooked up to an input of said receiver control device, said wire-based control device is hooked up to said microchip by a network bus, said input microchip comprising:
  means for analyzing the control signals intended to be transmitted by said wire-based control device to said microchip, and
  transmission means for transmitting, to the receiver control device, signals corresponding to said signals transmitted by the wire-based control device, in a format suited to said receiver control device.

Preferably, said input microchip forms said means for recovering and transmitting state information about the electrical units.

According to a third embodiment of the invention, the installation also comprises a first microchip connected to the receiver control device so as to recover signals from said receiver control device generated on the basis of the signals received by said receiver control device, and said management system comprises relays each exhibiting a pole, or pin, able to be linked to one of said electrical units and another pole, or pin, able to be linked to the DC power supply, and at least one control block which includes said or a part of said relays and a second microchip designed to drive the control input of each of the relays of said control block, said or each control block and the first microchip being able to communicate with one another through a network on which said first microchip is able to transmit signals comprising control information generated on the basis of the signals recovered from said receiver control device, said second microchip of the or of each control block being configured to drive the relays of said control block as a function of the control information transmitted on said network.

The presence of the microchip connected to the receiver control device and mounted in a network with at least one control block makes it possible to control via the network thus created, in a simple and reliable manner, electrical units sited remotely with respect to the receiver control device.

Furthermore, by virtue of the presence of a microchip at the output of the receiver control device and of the design of a multiplexed network between said microchip and the power supply management system for the power outputs associated with the electrical units, it is possible to use said microchip to transmit to the management system a control signal for activating or deactivating one or more electrical units on the basis of a combination of signals received by the receiver control device. It is thus possible to define a combination of signals resulting from the invoking of a plurality of actuators, simultaneously or in a given order, and to configure the microchip so as to assign a particular control signal to this combination.

Said management system is able to control said power outputs, independently of one another or simultaneously, as a function of the signal or signals transmitted on the network by the control device or devices.

Said or each control block is interposed, on the one hand, between said electrical units and said control device or the control devices, and, on the other hand, between the electrical units and the DC power supply. Said control information which travels over the network comprises information arising from the processing by said first microchip of output signals from said receiver control device. This information is transmitted by said first microchip over said network in a format suitable to be understood by the or each control block.

Said first microchip can thus translate the control signals that it receives and transform them into data on the network bus. The use of such a network makes it possible to benefit from a significant number of power outputs, thereby offering the possibility of driving a large number of electrical units conveniently and reliably. Indeed, by virtue of the use of a multiplexed network between the lighting units and the or each control device, pressing one of the actuators of the control device can operate or stop any power output of a control block of the network. The assignment of the actuators to the electrical units to be controlled can be performed in a convenient manner by software for parametrizing the network, for example via a computer.

Advantageously, said first microchip and said receiver control device are housed in one and the same casing.

According to a fourth embodiment of the invention, said first microchip also comprises a plurality of outputs to which are hooked up the control inputs of a part of said relays. Said relays can thus be driven directly by said microchip, that is to say so as to activate or not activate the powering by the DC power supply source of the electrical units hooked up to the relays.

Advantageously, within the framework of this third embodiment, said first microchip and said receiver control device are housed in one and the same casing furnished with means of connection to the electrical units to be driven, with means of connection to the DC power supply and with means of connection to said network.

According to an advantageous characteristic of the invention, said relays are field-effect transistors. Preferably, each relay is furnished with means for determining the intensity of current which passes through said relay, and said receiver control device or the microchip which drives said relay is able to drive said relay as a function of the intensity of current determined. Advantageously, said installation comprises means for determining, on the basis of said determined intensity of current, the state of the electrical unit hooked up to said relay and means for signaling said state.

The fact that the electrical units to be controlled can be supplied by DC current, in particular at low voltage or very low voltage, that is to say preferably 12V or 24V, makes it possible to use static relays comprising field-effect transistors which offer functionalities of reliable and inexpensive protection. Furthermore, as set forth hereinafter, such field-effect transistors offer the possibility of determining the current which passes through them and of driving them as a function of this current so as not only to protect the power supply circuit and the corresponding electrical unit but also to upload information related to this current, thereby making it possible to carry out a function for diagnosing the electrical unit controlled by the corresponding field-effect transistor.

According to an advantageous characteristic of the invention, the installation comprises calibration means making it possible to adjust for each relay a value of intensity of current beyond which said relay prevents the power supply of the corresponding electrical unit by the DC power supply.

According to an advantageous characteristic of the invention, there is envisaged a fuse interposed between the DC power supply and the power supply management system.

According to an advantageous characteristic of the invention, the emitter control device comprises a watertight casing.

The emission means and the actuators are housed in said casing. Of course, the casing is configured to allow the user to exert a press on said actuators.

The invention also relates to a structure, such as a vehicle or mobile house, comprising a plurality of electrical units and a control installation such as described hereinabove for said electrical units.

The invention also relates to a method of mounting a control installation for electrical units in a structure, such as a vehicle or mobile house, equipped with a DC power supply, such as an original battery and electrical units intended to be powered by the DC power supply, characterized in that the receiver control device and the management system are integrated into said structure by interposing said management system between said electrical units and said original DC power supply which forms said DC power supply of the installation.

The invention will be well understood on reading the following description of exemplary embodiments, with reference to the appended drawings in which.

With reference to the figures and as recalled hereinabove, the invention relates to a control installation making it possible to control the electrical power supply for a plurality of electrical units 3.

Said electrical units 3 are units whose operation requires an electrical power supply, such as LED lighting, navigation lights, a pump or any other load unit which consumes electrical power when it is linked to a suitable electrical power supply 4, here a DC power supply.

Said installation comprises a DC power supply 4. In the example illustrated in the figures, this DC power supply is a supply battery. Said DC power supply can also be an AC/DC power supply. Stated otherwise, the installation operates under direct current, said direct current being able to originate from a battery or from an AC/DC power supply. Thus the description given hereinbelow for a battery also applies to an AC/DC power supply.

Said battery is preferably intended to deliver a current of voltage, called low voltage or else very low voltage, of between +/−12V and +/−48V, advantageously, +/−12V, +/−24V or +/−48V. Said current is able to supply a plurality of power outputs 53, formed by a harness of cables, intended to supply said electrical units 3. Of course, said battery can itself be wired up, via a transformer, to the electrical mains, that is to say to the electrical energy network which delivers an alternating-voltage current.

Advantageously, said control installation can be fitted in structures, such as vehicles (car, boat, or camping van) or mobile houses, which comprise an onboard system formed of several electrical units operating with a DC power supply, preferably at low voltage.

The installation also comprises a management system 5 for the power supply of said electrical units 3. In particular, as detailed hereinafter, said system makes it possible to manage the passage of current between the battery 4 and each power output 53 intended to be linked to an electrical unit 3.

Stated otherwise, said management system 5 makes it possible to open or to close the electrical link between the battery 4 and each power output 53, and therefore the corresponding electrical unit 3, independently of the other electrical units.

For this purpose, said management system 5 is interposed between, on the one hand, the electrical units 3 and the battery 4, and, on the other hand, between the electrical units 3 and the control device or devices 2, 6. As detailed hereinafter, the fact that the electrical units are supplied with DC current and not with AC current makes it possible to design a compact and very reliable power supply management system 5, which furthermore makes it possible to reduce the cross section of the wires of the power outputs 53 and thus to limit the weight and the cost of the installation. This is particularly advantageous in the case of a vehicle such as a boat, where space is restricted and where the weight influences the energy consumption.

As detailed hereinafter, provision may be made for said management system 5 to also be equipped with a system 7 making it possible to simultaneously control the opening or the closing of the electrical link between the battery 4 and the assembly of electrical units 3, or between the battery 4 and a group of electrical units 3.

Said management system 5 is able to be controlled by a radio control assembly which comprises an emitter control device 1 and a receiver control device 2.

The emitter control device 1 comprises radiofrequency emission means 10 and actuators 11 of push-button type. Each actuator 11 comprises a transducer. In the example illustrated in the figures, said transducer is an electromechanical transducer making it possible, in the actuated state, for example by exerting a pressure loading on said actuator, in at least one direction, to generate, for example by piezoelectric effect or by induction, an electric current making it possible to electrically energize said emission means 10 so as to control the emission by said emission means 10 of a radiofrequency signal.

Provision may also be made for the transducer to be configured so as to make it possible to transform a renewable energy source, such as solar energy, or wind energy, or a temperature difference, into an electric current making it possible to electrically energize said radiofrequency emission means.

Said radiofrequency signal emitted subsequent to the invoking of said actuator is associated with said actuator and therefore with the electrical unit which is intended to be controlled by said actuator. Stated otherwise, said radiofrequency signal transports an item of information signifying that the corresponding actuator of the emitter control device has been pressed, thereby allowing the receiver control device 2, as detailed hereinafter, to determine the power output 53 to be controlled, said power output 53 being associated with one of the electrical units 3.

Advantageously, said radiofrequency signals are coded signals, for example on 32 bits, and the receiver control device 2 comprises instructions making it possible to decode said signals and thus to identify the output to be driven.

The radiofrequency signals associated with the various actuators 11 of the emitter control device 1 are preferably mutually distinct so as to make it possible to associate a specific item of information with each radiofrequency signal. Distinct is understood to mean that the signals can be differentiated by the receiver control device 2 in such a way that the receiver control device 2 can be configured so as, as a function of each signal received, to transmit to the management system 5, a control signal suited to the electrical unit 3 which is associated with said signal received.

Preferably, the activation and the deactivation of the power supply of a given electrical unit 3 are controlled by one and the same actuator 11, that is to say by one and the same signal. The activation or the deactivation of the power supply results from the state, deactivation or activation, which said electrical unit 3 is in before the reception of said signal. Stated otherwise, the signal associated with each actuator 11 is a change-of-state control signal for the electrical unit. As a variant, in particular with a microchip 9 situated downstream of the receiver control device 2 as detailed hereinafter in FIG. 3 or 4, provision may be made for the driving of one or more electrical units 3 to be carried out on the basis of a combination of control signals.

The production of each actuator 11 in the form of a transducer, called an electromechanical transducer, makes it possible, simply by exerting a mechanical force on the actuator, for example by pressing the actuator with a finger, to generate an electric current making it possible to power the emitter control device 1 emission means. Said emission means then emit a radio frequency signal associated with said actuator 11.

Figure 3:
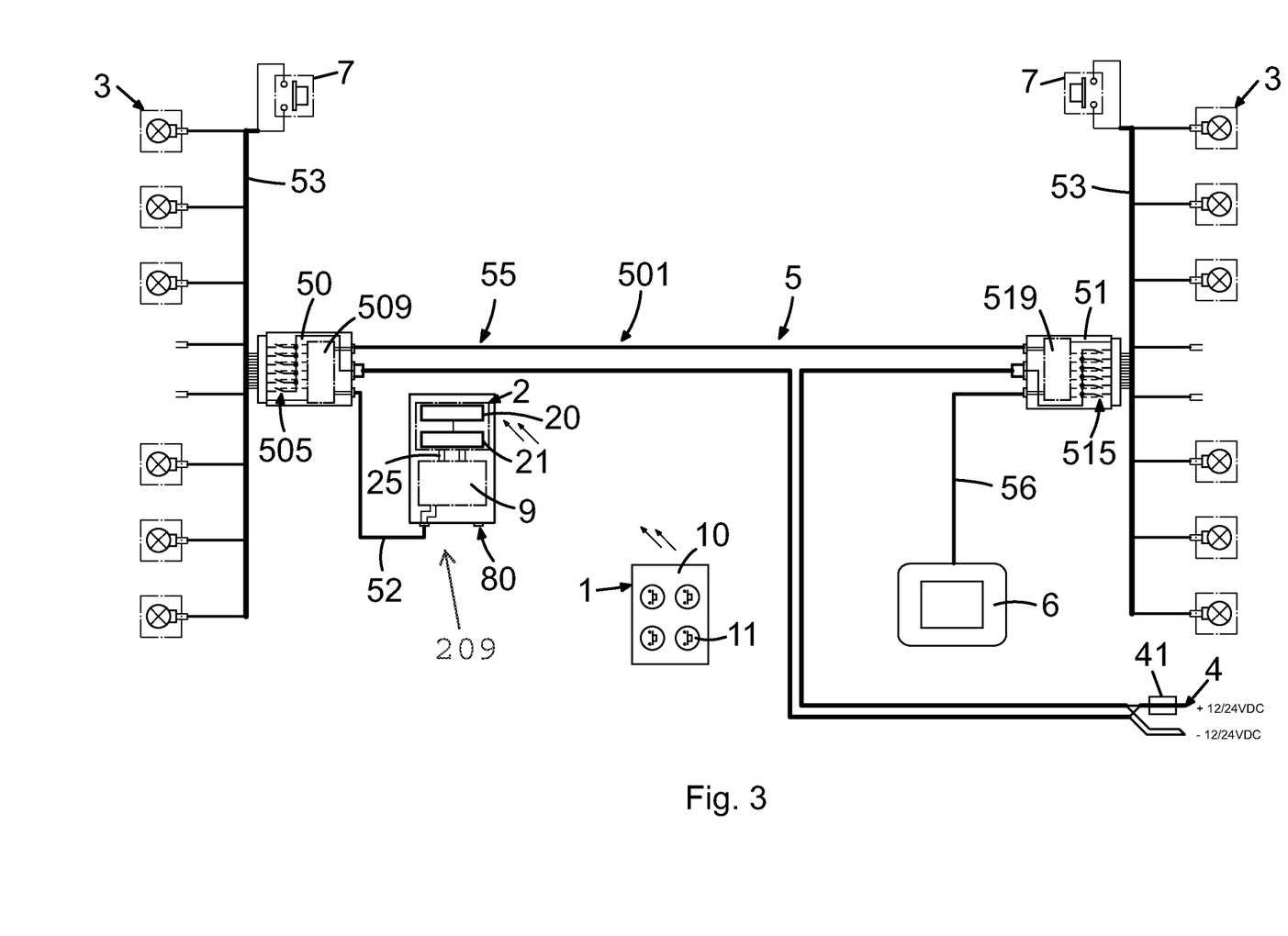
FIG. 3 is a schematic view of the communication installation according to a third embodiment of the invention.
Figure 4:
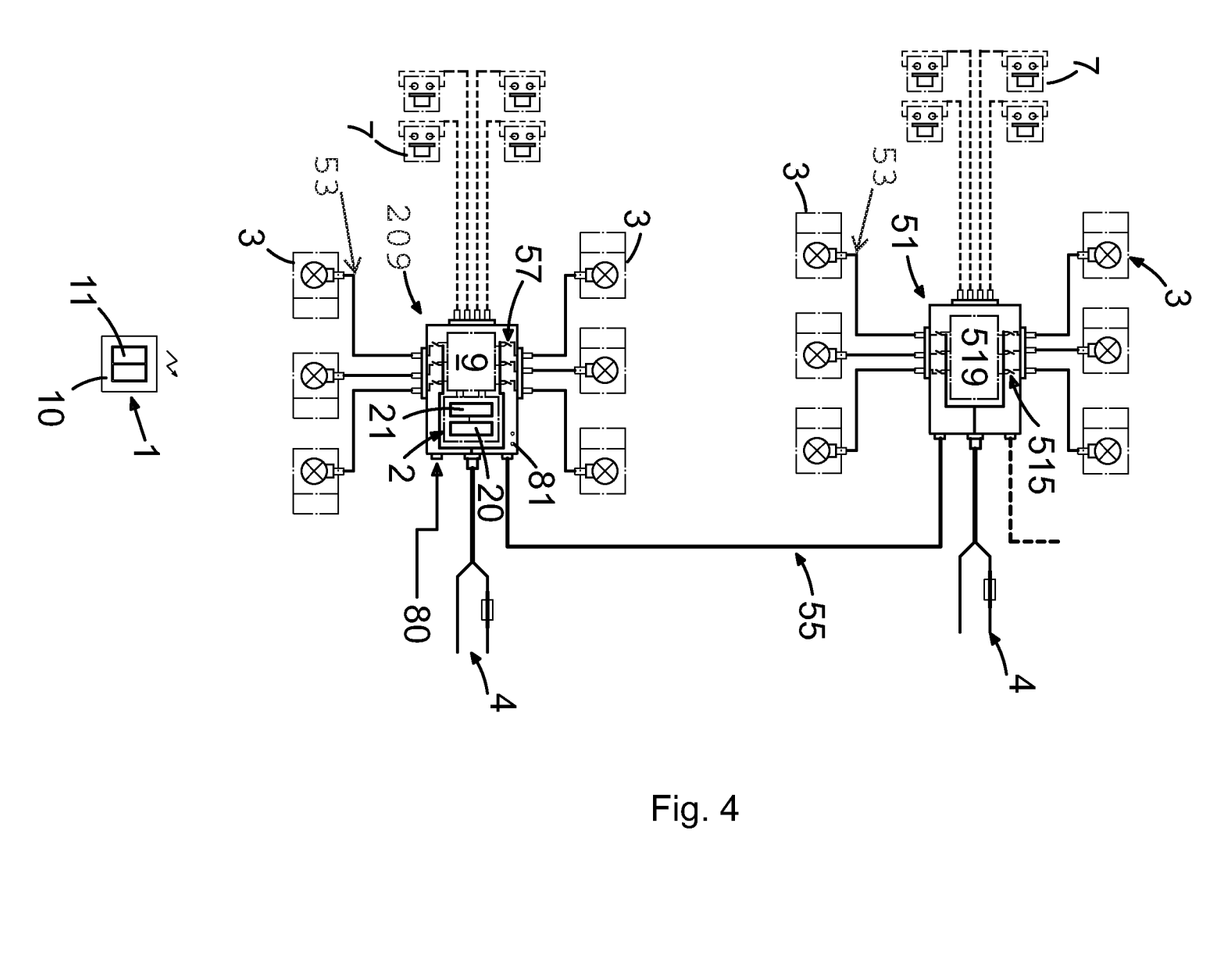
FIG. 4 is a schematic view of the communication installation according to a fourth embodiment of the invention.

The receiver control device 2 comprises radiofrequency reception means 20, able to receive said radiofrequency signal emitted by said emission means 10, and processing means 21 for said signal making it possible to transmit to the management system 5, optionally via a microchip 9 as in the embodiment illustrated in FIG. 3 or 4, a control signal dependent on the radiofrequency signal received, so as to activate or deactivate the power supply of at least part of said electrical units 3.

In particular, said receiver control device 2 also comprises outputs 25 by which said processing means 21 are able to transmit control signals of the power outputs 53 associated with said electrical units 3.

Such a wireless control assembly with no power cell, comprising an emitter control device and a receiver control device, is sold by the company EnOcean Gmbh or EnOcean Inc. The receiver control device is usually designated by the reference TCM300 and the emitter control device is usually designated by the reference PTM200.

Advantageously, the range of said emitter control device 1 is of the order of 30 meters outdoors.

The emitter control device 1 can be positioned on the structure to be equipped in place of the conventional control switches linked to the electrical network.

Said or each emitter control device 1 can be installed without any wire-based connection since the use of transducers renders it energy-autonomous and the radio link makes it possible to transmit control signals with no cable.

With such a control assembly, each actuator can be associated with a given electrical unit without having to worry about the wiring between said actuator and said electrical unit.

Figure 1:
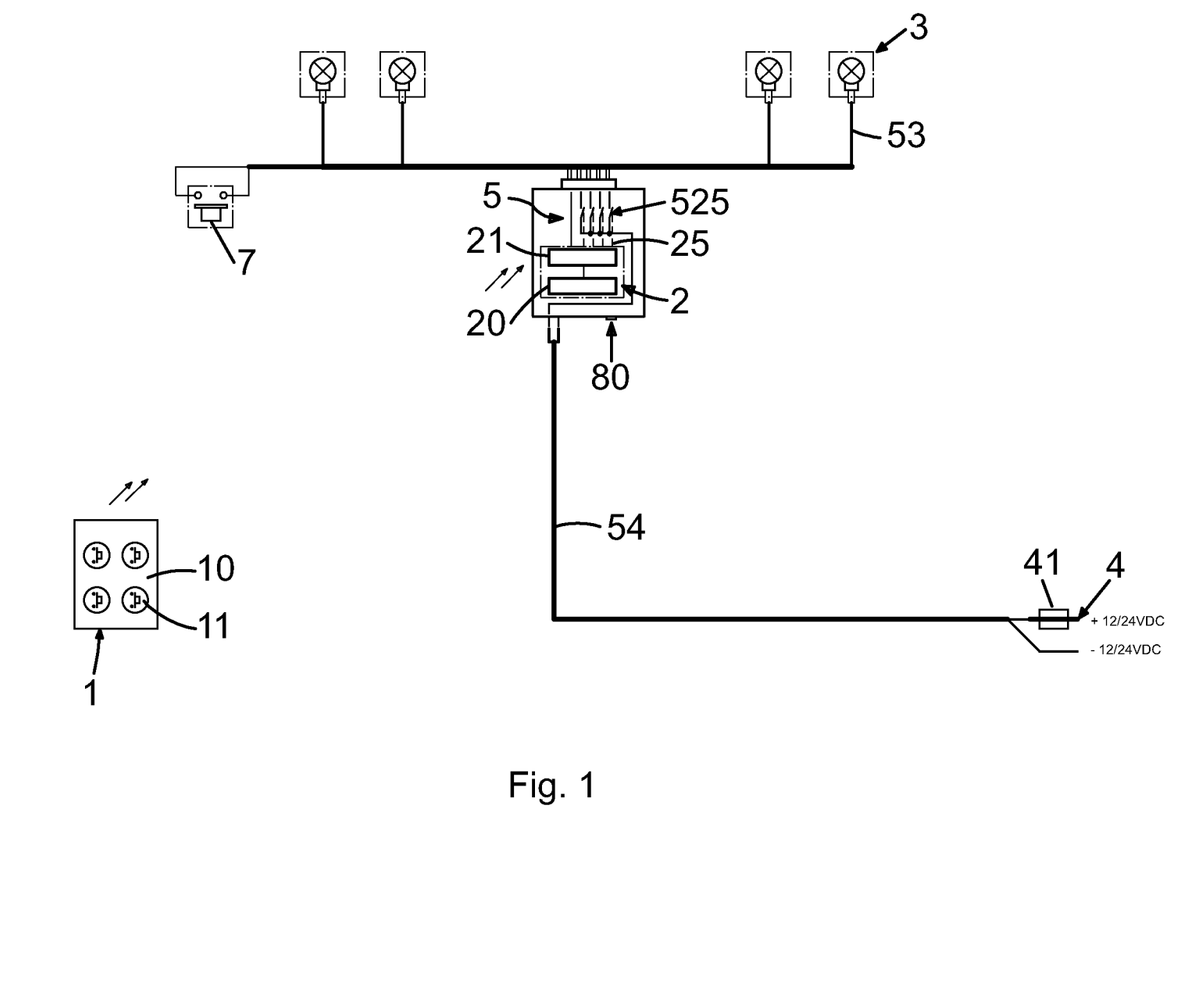
FIG. 1 is a schematic view of the communication installation according to a first embodiment of the invention.

In the example illustrated in FIG. 1, for which the management system 5 is formed of relays 525, the control input of each relay 525 is linked to an output 25 of the receiver control device 2.

Each relay 525 is interposed between a power output 53 linked to an electrical unit 3 and the battery 4. Stated otherwise, each relay 525 exhibits a pole, or pin, hooked up by a power supply harness 54 to the battery 4 and another pole, or pin, hooked up by a power harness to an electrical unit 3. As detailed hereinafter, the control input of a relay 525 is hooked up to one of the outputs 25 of the receiver control device 2

A fuse 41, for example of 40 amperes, is also present on the power supply harness 54 which extends between the management system 5 and the battery 4 so as to protect said power supply harness in case of short circuit and thus avoid a risk of fire in the structure equipped with the control installation.

Regarding the receiver control device 2, said means for processing said signal 21 comprise a microchip furnished with storage means in which identification information for the signals associated with the actuators 11 of the emitter is stored. Each item of identification information is also associated with an output 25 of the receiver control device 2. Thus, each actuator 11 of the emitter is associated with an output 25 of the receiver control device 2.

Generally, the processing means 21 are configured so as to make it possible to associate each output 25 of said receiver control device 2 with a signal received. In the embodiment illustrated in FIG. 2, for which the installation furthermore comprises a wire-based control device 6 hooked up to the receiver control device 2, said signal received by said receiver control device 2 can be a radiofrequency signal or a signal emitted in a wire-based manner.

The microchip 21 of the receiver control device 2 makes it possible to identify the signals received with the aid of the identification information and to activate the corresponding output or outputs 25 by emission of a signal on this output. In the example illustrated in FIGS. 1 and 2, the activation of an output 25 of the receiver control device 2 makes it possible to activate the control input of the corresponding relay 525 of the management system 5 and thus to activate or to deactivate the power supply of the power output 53 hooked up to said relay 525.

As recalled hereinabove, said management system 5 is able to control said power outputs 53, independently of one another, as a function of the radiofrequency signal or signals received by the receiver control device.

Whatever embodiment is envisaged, the installation can also comprise a grouped control system 7 comprising an actuator configured so as, in the actuated state, to simultaneously control the opening or the closing of the electrical links between several electrical units 3, that is to say a group of electrical units, and the battery 4 so as to make it possible to simultaneously activate or deactivate said group of electrical units 3. For this purpose, as illustrated in FIG. 1, said management system 5 can be equipped with at least one actuator 7, such as a push-button, and with an electrical circuit able to be closed or opened by invoking of said actuator 7.

When an operator pushes the actuator 7, the closing of the circuit is detected and each relay control input is activated so as to simultaneously open or close the electrical link between the group of corresponding electrical units 3 and the battery 4. In the example illustrated in FIGS. 1 and 2, the actuator 7 is hooked up to the receiver control device so that it is the receiver control device 2 which detects the closing of the circuit by the actuator 7. Said receiver control device 2 can thus activate each output 25 linked to the control input of a relay so as to activate or deactivate each power output 53. In the example illustrated in FIG. 3, each control block 50, 51 is furnished with an actuator 7 hooked up to said control block 50, 51, so that said control block 50, 51 detects the closing of the circuit by the corresponding actuator 7.

Thus, in the example illustrated in the figures, the actuator 7 makes it possible to control a group of relays (FIG. 3) or the assembly of relays (FIGS. 1 and 2) so as to activate or deactivate the electrical power supply between a group of corresponding electrical units 3 and the battery 4 or the assembly of said electrical units 3 and the battery 4. The or each grouped control system 7 makes it possible to control the assembly or a group of electrical units directly in a wire-based manner. Provision may also be made for a direct control actuator for each electrical unit 3 to be controlled.

Said receiver control device 2 also comprises an input for hookup 80 to a programming console (not represented) making it possible to pair, that is to say to adjust the assignment, of the outputs 25 of said receiver control device 2 to the actuators 11 of the emitter control device 1 and, if appropriate, to the actuators of the wire-based control device 6 detailed hereinafter. Provision may also be made for said receiver control device 2 or for the casing in which said receiver control device 2 is integrated as in the example illustrated in FIG. 4 to be furnished with buttons 81 for direct pairing.

Figure 2:
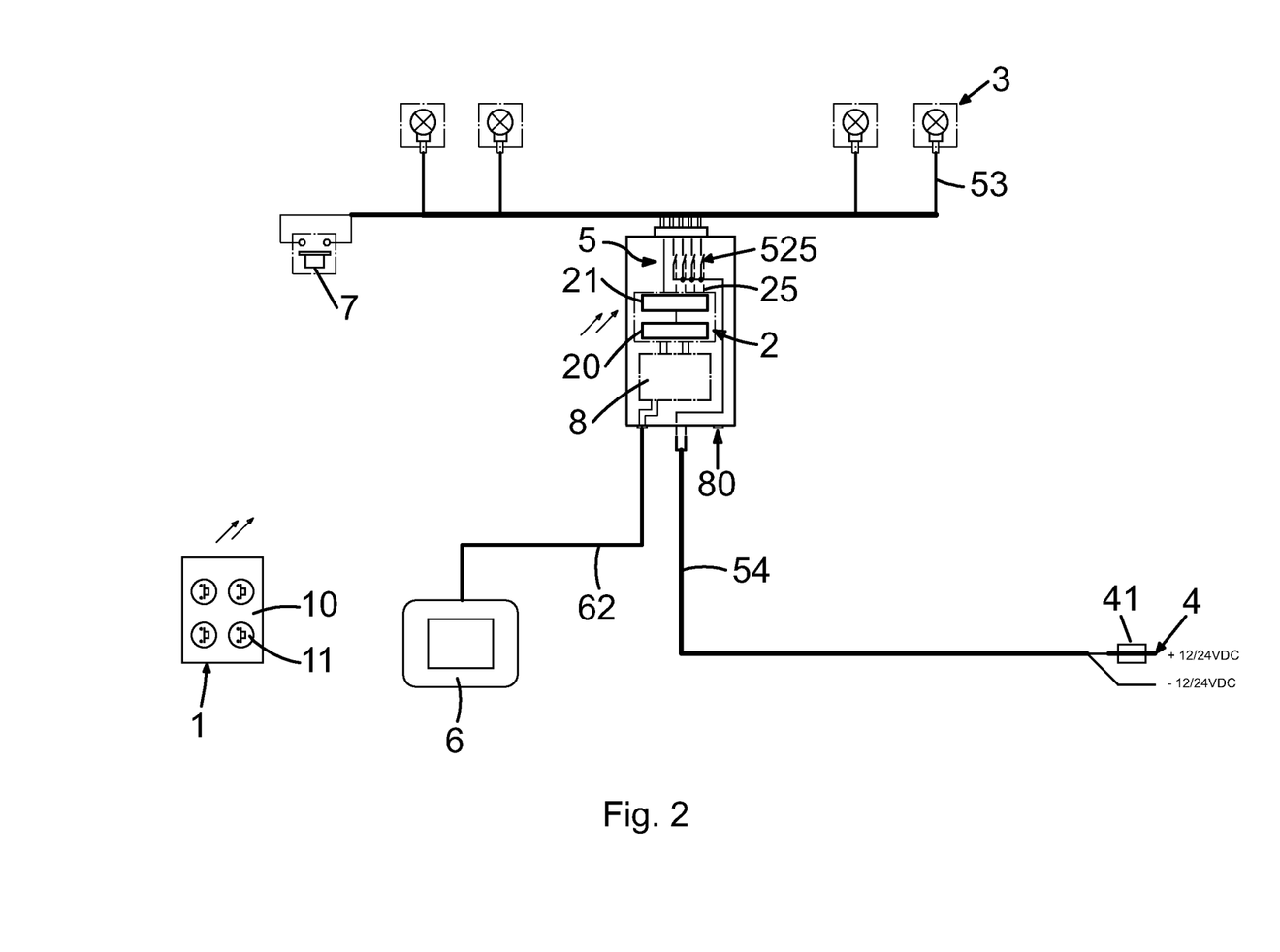
FIG. 2 is a schematic view of the communication installation according to a second embodiment of the invention.

According to a particular embodiment illustrated in FIG. 2, provision may be made to modify the installation of the embodiment illustrated in FIG. 1, by adding a microchip 8, comprising for example a microprocessor or microcontroller, able to communicate with the processing means 21 of the receiver control device 2 so as to recover the information regarding active or inactive state of the power supply of the power outputs 53 and therefore of the corresponding electrical units 3.

According to this embodiment illustrated in FIG. 2, the installation also comprises a wire-based control device 6 which comprises means for signaling, preferably by display, information corresponding to the active or inactive state of the power outputs 53, that is to say to the state, supplied or not, of the electrical units 3. Said signaling means can be simply formed by telltale lights each associated with an electrical unit, said telltale being lit up when the electrical unit with which it is associated is activated.

Advantageously, said wire-based control device 6 is hooked up to the microchip 8 itself hooked up to the receiver control device 2. In the example illustrated in FIG. 2, said wire-based control device 6 communicates through a network bus 62, preferably a CAN network bus, with the microchip 8 of said receiver control device 2.

The microchip 8 communicates with the microchip 21 of the receiver control device 2 by a wire-based link, preferably a serial link, which may be common with the input of the receiver control device 2 which allows the assignment, with the aid of a programming console, of the outputs 25 of the receiver control device 2 to the actuators 11 of the emitter control device 1.

Said wire-based control device 6 comprises actuators, for example defined by zones of a tactile interface, which are each configured so as, in the invoked state, to transmit through the wire-based link 62 a control signal, in the form of a data frame, to the microchip 8. Said microchip 8 analyses said signal received by comparing it with identification information that it possesses in memory. Said identification information is associated with the electrical units 3 to be controlled, or with intermediate elements such as the outputs 25 of the receiver control device, or the power outputs 53. As a function of the result of the analysis of the signal received, that is to say when the microchip 8 has identified the electrical unit 3 to be controlled or an associated element which corresponds to said signal received, said microchip 8 transmits a control signal for said electrical unit to the processing means 21 of the receiver control device 2 in a format suited to said processing means 21 of the receiver control device 2. Said processing means 21 then activate the output 25 corresponding to said control signal received, thereby allowing the management system 5 to drive the power supply of said electrical unit 3.

The presence of the wire-based control device 6 makes it possible to obtain an installation furnished with dual radio and wire-based control. Furthermore, said means for signaling the power supply state of the electrical units offer comfort and great safety for the driving of the electrical units, since, by virtue of said signaling means, the operator gets information feedback relating to the state of the electrical units even when the latter are not accessible and/or visible to the operator.

Of course, said means for signaling the active or inactive state of the electrical units can be distinct from the wire-based control device 6. It will be noted that such means for signaling the active or inactive state of the electrical units are not present in the embodiment illustrated in FIG. 1, so that such an embodiment illustrated in FIG. 1 preferably applies to the control of electrical units whose activation, or enabling, is visible, such as lighting units.

The recovery of the state of each of the electrical units is performed by recovery of the active or inactive state of the power supply of each of the power outputs 53, which state can be determined either, as in the example illustrated in FIG. 2, on the basis of the outputs 25 of the receiver control device depending on whether the corresponding relay does or does not close the electrical link between the battery and the electrical unit, or as in the example illustrated in FIG. 3 or 4, by analysis of data transmitted on the network by the or each control block indicating the active or inactive state of the power supply of the corresponding electrical units.

In the absence of such information feedbacks, the user would not know the power supply state of each of the electrical units, which could lead him to make handling errors, in particular when one and the same actuator serves to control the active or inactive state of said unit. By knowing the active or inactive state of the power supply of the various electrical units, the user is able to drive the electrical units in a reliable manner without risk of error.

Such information return increases the safety of the installation since this makes it possible to prevent an electrical unit from remaining permanently powered without the user realizing it, which would generate risks of damage and/or of fire for the structure equipped with said installation.

According to another embodiment illustrated in FIG. 3, provision may be made to modify the installation of the embodiment illustrated in FIG. 1, by adding a microchip 9. For this purpose, the microchip 9 is hooked up to the outputs 25 of the receiver control device 2 so as to recover the output signals 25 of said control device 2. The microchip 9 is configured to analyze the output signals 25 of the receiver control device 2 and transmit the information transported by said signals to the power outputs 53 management system 5.

The receiver control device 2 and the microchip 9 are housed in one and the same casing called a reception block 209.

The functions detailed hereinabove associated with the microchip 9 and with the microchip 21 can be carried out with the aid of one and the same electrical and/or computer system, such as a microprocessor or microcontroller. These functions are generally carried out in the form of computing instructions.

In the embodiment illustrated in FIG. 3, the management system 5 comprises two control blocks 50, 51 each including a microchip 509, 519 and relays 505, 515 for controlling outputs 53 for powering electrical unit 3. The electrical units 3 are thus distributed into two groups driven by the control blocks 50, 51.

Said or each control block 50, 51 comprises a plurality of outputs linked to the power outputs 53 intended to supply said electrical units 3. Each control block 50, 51 also comprises an input for hookup to said battery 4.

Said relays 505, 515 of each control block 50, 51 are interposed between the power outputs 53 associated with the corresponding electrical units 3 and the DC power supply source 4. The control input of each of said relays is driven by the microchip of the corresponding control block. The relays 505, 515 thus make it possible to drive the closing or the opening of the electrical link between each power output 53 associated with the corresponding power block and the battery 4.

The control blocks 50, 51 are mounted in a network 55 with the reception block 209. In particular, each microchip 9, 509, 519 is able to communicate on said network 55.

The microchip 509, 519 of the or of each control block 50, 51 of the management system 5 is configured so as to make it possible to associate each output of said control block 50, 51 with a control signal or item of information. This control signal can be a signal transmitted on the network 55 by the reception block 209 or by the wire-based control device 6 hooked up to said network.

The microchip 9 is configured to transmit on the network 55 the information transported by the output signals 25 of the receiver control device 2, and the microchips 509, 519 are configured so as to drive the relays 505, 515 as a function of the control information transmitted on the network. As detailed hereinafter, said microchips are also configured so as to emit on the network information representative of the operating state of the electrical units.

The network 55 makes it possible to upload state information for the electrical units. Thus, when a microchip which controls the activation of a relay, determines that the current consumed by the associated electrical unit is zero, said microchip can diagnose a problem relating to said electrical unit and upload the item of information on the network so that a suitable information recovery system, for example the device 6, can alert the user.

In this embodiment illustrated in FIG. 3, the control block 50 is hooked up by a network bus 52 to the reception block 209 and by a network bus 501 to the control block 51.

Said microchip 9 comprises processing means making it possible to interpret the signal received from an output 25 of the receiver control device 2 and to transmit one or more corresponding items of control information in a data frame on the network 55 in a suitable format that can be analyzed by each microchip 509, 519 of the control block 50, 51 connected to the network 55.

The analysis of the signals received makes it possible to transmit on said network an item of control information for one or more power outputs. The microchip 509, 519 of each control block 50, 51 comprises processing means making it possible to analyze the information of the data frames transmitted on the network and to control the relays 505, 515 associated with the power outputs 53 as a function of said information.

Thus, when the microchip 9 or another device 6 transmits a data frame on the network 55, said or each control block 50, 51 analyses the frame so as, if appropriate, to extract therefrom a power output 53 item of control information. When said item of control information designates a power output 53 for which it has management, that is to say for which said control block 50, 51 exhibits an output linked to said power output 53, said processing means of said control block 50, 51 control the associated relay to open or close the corresponding electrical link between said power output 53 and the battery 4.

In a simplified manner, said microchip 9 makes it possible to dispatch on the network 55 information corresponding to the signals received by the receiver control device 2.

Such an embodiment for which the management system comprises one or more output control blocks in a network with the receiver control device is particularly advantageous within the framework of an installation comprising a significant number of mutually distant electrical units. The network 55 makes it possible to dispatch in a reliable manner the item of control information at various locations distant from the installation without requiring multiple receiver control devices. Furthermore, the microchip 9 hooked up at the output of the receiver control device 2 makes it possible to work the signals received by said receiver control device 2 so as to generate richer control information.

Stated otherwise, the casing 209 which includes said receiver control device 2 and the microchip 9 forms a master module whose control information generated on the basis of the signals received from the emitter control device 1 is transmitted on the network 55 to the control blocks 50, 51 which then form slave modules.

The wire-based control device 6 described in the embodiment illustrated in FIG. 2 communicates here directly with the second control block 51 through a network bus 56.

Thus, said wire-based control device 6, said microchip 9 linked to the receiver control device 2 and the multiplexed control block or blocks 50, 51 together form elements or nodes of a network 55 on which may be transmitted multiplexed signals taking the form of data frames comprising control and/or state information for the power outputs 53 and therefore for the corresponding electrical units 3.

Advantageously, said network is a CAN network. The CAN (Control Area Network) network, is an internal communication system whose data bus or buses, to which the microchips are connected, allows(allow) the latter to exchange information rapidly.

The production of a communication network between the microchip 9 associated with the receiver control device 2 and the or each control block of the management system 5 makes it possible to conveniently control remote electrical units and to conveniently upload information, in particular state information for the electrical units, to a remotely sited display and/or control system, such as an instrument panel, that can be hooked up to said network.

Just as for the embodiment illustrated in FIG. 2, the presence of a wire-based control device 6 in addition to the radio control assembly 1, 2 makes it possible to benefit from a dual-control system, one wireless and with no power cell and the other wire-based, thereby making it possible to obtain a reliable operating installation with a reduced risk of fault. Such a wire-based and radio dual-control system offers great flexibility of operation and management of the electrical units.

FIG. 4 illustrates an embodiment according to which the management system 5 comprises, just as for the embodiment illustrated in FIG. 3, relays driven by microchips.

In the case of FIG. 4, the microchip 9 of the master module 209 is configured not only to manage the transmission of the information on the network 55, but also to drive relays 57 of power supply outputs, or power outputs, included in this module 209, as a function of the instructions received by the receiver control device 2. Said first microchip 9 also comprises an input for hookup to the DC power supply 4 and each relay 57 comprises a pole, or pin, hooked up to the DC power supply 4 and another pole, or pin, hooked up to the power output to be controlled. The control input of said relay is driven directly by said microchip 9.

Thus, if the receiver control device 2 receives a control instruction for an output corresponding to one of the outputs 53 of said module 209 drivable directly by the microchip 9, the microchip 9 which recovers the signals at the output 25 of the receiver control device 2, activates the corresponding relay 57 directly so as to supply the associated electrical unit 3. The microchip 9 is also configured to transmit on the network 55 an item of information indicating that said output is activated so as to make it possible to upload said item of information to suitable signaling equipment such as an instrument panel. Such information feedback is detailed hereinafter.

By comparison with the embodiment illustrated in FIG. 3, such an embodiment of the type of that illustrated in FIG. 4, for which the microchip 9 of the reception module 209 is also configured to drive relays 57 integrated into the module 209, makes it possible to limit the number of control modules or blocks of the installation. In particular, the fact of furnishing the casing 209 with power output 53 makes it possible to directly control the electrical units 3 present in proximity to the receiver control device 2 without having to add any additional control block extra to those required for controlling, by way of the network 55, the corresponding remote electrical units 3.

Advantageously, the power supply intensity level of each output 53 is adjustable. For this purpose, provision may be made for the installation to be furnished with dimmer(s), making it possible to tailor the intensity of current which supplies the or a part of the electrical units. The adjustment can be performed with the aid of the emitter control casing 1 which makes it possible to transmit to the receiver control device 2, not only an item of information regarding turn-on or otherwise of an output, but also an item of information regarding power supply intensity level to be applied to the corresponding electrical unit 3. By way of example, provision may be made for the pressing of a push-button 11 to generate an activation signal, and for the intensity level requested to be higher, the longer the push-button is pressed.

Subsequently in the description, a preferred embodiment of the relays is described, which can be applied to any embodiment of the installation detailed hereinabove.

Said relays 525, 505, 515, 57 of the various embodiments detailed hereinabove are field-effect transistors, also called MOSFETs.

Figure 5:
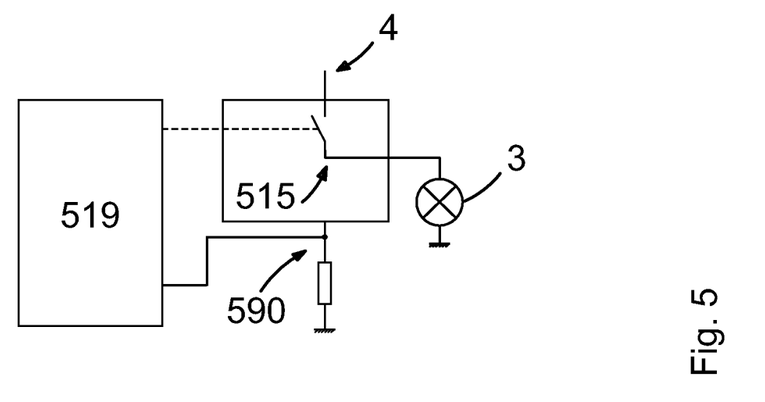
FIG. 5 is a schematic view of an embodiment of a relay making it possible to supply an electrical unit while determining the intensity of current which passes through said relay.

Each relay 525, 505, 515, 57 comprises means 590 for determining the intensity of current which passes through said relay, also called current mirrors. FIG. 5 illustrates such a relay furnished with means of determination 590 in the context of a relay 515 driven by the microchip 519. Of course this figure is transposable to the relays of the other embodiments. The microchip 21, 509, 519, 9 which drives said relay 525, 505, 515, 57 is able to drive said relay as a function of said intensity measurement.

The microchip 21, 509, 519, 9 which controls a power supply relay 525, 505, 515, 57 of an electrical unit advantageously comprises calibration means making it possible to define for said relay 525, 505, 515, 57 a value of intensity of current which passes through it, beyond which said relay opens so as to prevent the powering of the corresponding electrical unit 3 by the DC power supply 4.

Thus, said means of adjustment or calibration make it possible to limit the allowable intensity of current to a threshold value beyond which the static relay opens the electrical link between said power output 53 and the battery 4 so as to isolate the corresponding electrical unit 3 from the battery 4. Said adjustment or calibration means can be effected in the form of computing instructions executed by the microchip 21, 509, 519, 9 which drives the corresponding relay 525, 505, 515, 57.

The possibility of measuring the intensity of current which passes through the relay and of driving said relay accordingly offers a function for protecting the electrical unit and the cable of the corresponding output, thereby making it possible to adapt the cross section of said cable to the intensity of current intended to be consumed by the electrical unit, and therefore to limit the cross section of the cable which links the electrical unit to the relay. Such a solution then makes it possible to limit the weight and the cost of the installation. It should be noted that such field-effect transistors are not usable with AC current.

Furthermore, the microchip which drives a given relay comprises means for determining, on the basis of said intensity measurement, the state of the electrical unit 3 hooked up to said relay. The microchip can thereafter transmit on the network 55 (FIGS. 3 and 4) or through the link 62 (FIG. 2) an item of information about the state of said electrical unit 3 which is recoverable by signaling means, such as an instrument panel.

For this purpose, said microchip, for example the microchip 519, recovers said intensity measurement through an input connected, as illustrated in FIG. 5, at the level of the output 590 of said relay, for example the relay 515, which delivers said measurement of the current. Advantageously, said microchip compares the measured value with a reference value and determines the state of the electrical unit that it uploads on the network 55 so as to be able to inform the user.

Said means of determining current thus form diagnostic means in particular so as to detect a defective electrical unit. Indeed, if a power supply setpoint for a power output is emitted while the corresponding electrical unit is inoperative or has "blown", the current measured through the transistor remains zero, thereby making it possible to diagnose a problem at the level of said electrical unit. The calibration means also make it possible to diagnose a problem of short-circuit type.

The mounting of an installation such as described hereinabove in a structure, such as a vehicle or mobile house, commonly called a mobile home, equipped with electrical units 53 and with an original battery 4, intended to power said electrical units 3, can be performed in the following manner.

The expression original battery is intended to mean a battery present right from the design of the structure, or as it leaves the factory. Advantageously, at least a part of said electrical units 3 is present originally.

The receiver control device 2 and the management system 5 for the power outputs 53 are integrated into the vehicle by interposing said management system 5 between at least one part of the electrical units 3 and the original battery 4 which forms the DC power supply. The electrical units 3 are linked to the power outputs 53 of the management system 5 and the battery 4 is linked to a power supply input of the management system 5.

As a variant, provision could be made for the battery of the control installation not to be present originally in the structure.

Advantageously, the emitter control device 1 is portable in the manner of a remote control. As a variant, provision may be made to integrate the emitter control device into the vehicle, for example on an instrument panel of the vehicle.

Said management means, the processing means, the microchip or microchips each comprise one or more electronic and/or computer systems making it possible to perform processing and calculation operations. Each of these means can be embodied in the form of an electronic circuit preferably furnished with one or more microprocessor(s) or microcontroller. Thus, when it is specified that given means are configured so as to carry out a given operation, this signifies that the electronic and/or computer system which forms said means comprises instructions making it possible to carry out said operation. Generally, each of the functions detailed hereinabove can be carried out in the form of computing instructions executed by a microchip, formed for example of a microprocessor or of a microcontroller.

Provision may be made for said installation to comprise means for managing priorities comprising instructions making it possible to assign priorities to the signals received by said receiver control device 2 and/or to the signals transmitted on the network 55 in the case of the embodiments illustrated in FIGS. 3 and 4. Depending on the embodiment implemented, said means for managing priority can be implemented in the or each control block 50, 51 and/or in the microchip or microchips 8, 9 or in another system able to communicate with the management system 5.

The present invention is in no way limited to the embodiments described and represented, but the person skilled in the art will be able to devise any variant thereof in accordance with the spirit thereof.

The invention claimed is:

1. A control installation making it possible to control the electrical power supply of a plurality of electrical units, said installation comprising:

a DC power supply, such as a supply battery, able to power a plurality of electrical units, a management system for the power supply of said electrical units, said management system being interposed between said electrical units and the DC power supply, characterized in that said installation also comprises: an emitter control device comprising radiofrequency emission means and actuators each comprising a transducer in order to energize said radiofrequency emission means so as to control the emission of a radiofrequency signal, a receiver control device comprising radiofrequency reception means, able to receive the radiofrequency signals emitted by the emitter control device, and to transmit to the management system, control signals, dependent on the radiofrequency signal or signals received, so as to activate or deactivate the power supply of at least part of said electrical units, wherein said management system has relays each exhibiting a pole, or pin, able to be linked to one of said electrical units and another pole, or pin, able to be linked to the DC power supply, and the receiver control device has several outputs, a control input of each relay is linked to one of the outputs of the receiver control device so as to allow the receiver control device to control said relay as a function of the radiofrequency signal or signals received.

2. The installation as claimed in claim 1, wherein said transducer is able to transform a press exerted on said actuator into an electric current so as to energize said radiofrequency emission means.

3. The installation as claimed in claim 1, wherein said transducer is able to transform a renewable energy source, such as solar energy, or wind energy, or a temperature difference, into an electric current so as to energize said radiofrequency emission means.

4. The installation as claimed in claim 1, wherein the installation also comprises a first microchip connected to the receiver control device so as to recover signals from said receiver control device generated on the basis of the signals received by said receiver control device, and in that said management system comprises relays each exhibiting a pole, or pin, able to be linked to one of said electrical units and another pole, or pin, able to be linked to the DC power supply, and at least one control block which includes said or a part of said relays and a second microchip designed to drive the control input of each of the relays of said control block, said or each control block and the first microchip being able to communicate with one another through a network on which said first microchip is able to transmit signals comprising control information generated on the basis of the signals recovered from said receiver control device, said second microchip of the or of each control block being configured to drive the relays of said control block as a function of the control information transmitted on said network.

5. The installation as claimed in claim 4, wherein said first microchip also comprises a plurality of outputs to which are hooked up to control inputs of a part of said relays.

6. The installation as claimed in claim 5, wherein said first microchip and said receiver control device are housed in one and the same casing furnished with means of connection to the electrical units to be driven, with means of connection to the DC power supply and with means of connection to said network.

7. The installation as claimed in claim 1, wherein said relays are field-effect transistors.

8. The installation as claimed in claim 7, wherein each relay is furnished with means for determining the intensity of current which passes through said relay, and in that said receiver control device or the microchip which drives said relay is able to drive said relay as a function of the intensity of current determined.

9. The installation as claimed in claim 8, wherein said installation comprises means for determining, on the basis of said determined intensity of current, the state of the electrical unit hooked up to said relay and means for signaling said state.

10. The installation as claimed in claim 4, wherein the installation comprises calibration means making it possible to adjust for each relay a value of intensity of current beyond which said relay prevents the powering of the corresponding electrical unit by the DC power supply.

11. The installation as claimed in claim 1, wherein the emitter control device comprises a watertight casing.

12. A structure, such as a vehicle or mobile house, comprising a plurality of electrical units and a control installation for said electrical units, wherein said control installation complies with claim 1.

13. A method of mounting a control installation for electrical units in accordance with claim 1, in a structure, such as a vehicle or mobile house, equipped with a DC power supply, such as an original battery, and with electrical units intended to be powered by the DC power supply, wherein said receiver control device and said management system are integrated into said structure by interposing said management system between said electrical units and said DC power supply which forms said DC power supply of the installation.

* * * * *